United States Patent [19]
Abromavage et al.

[11] 3,843,162
[45] Oct. 22, 1974

[54] LOAD DAMPING FRAME HITCH FOR VEHICLES TOWING A TRAILER

[75] Inventors: John C. Abromavage, Tempe; James W. Ryden, Phoenix, both of Ariz.

[73] Assignee: Amerco, Inc., Phoenix, Ariz.

[22] Filed: Aug. 1, 1973

[21] Appl. No.: 384,764

[52] U.S. Cl. ............................ 280/486, 280/501
[51] Int. Cl. ............................................ B60d 1/06
[58] Field of Search ............ 280/486, 487, 501, 500

[56] References Cited
UNITED STATES PATENTS

| | | | |
|---|---|---|---|
| 1,091,989 | 3/1914 | Völler et al. | 280/486 X |
| 1,447,146 | 2/1923 | Novak | 280/486 |
| 1,632,070 | 6/1927 | Hawkins | 280/486 |
| 2,959,427 | 11/1960 | Keese | 280/486 X |

*Primary Examiner*—M. Henson Wood, Jr.
*Assistant Examiner*—John J. Love

[57] ABSTRACT

A load-damping motor-vehicle frame-type trailer hitch attachable at its forward end to a vehicle frame and at its rearward end to the automobile bumper, with means to allow relative motion between the two points of connection. The hitch includes a compression means which absorbs forward thrust loads in advance of placing a load upon the bumper, in the case of conventional bumpers, or, in the case of an energy absorbing bumper, adds energy absorption capability, allows return of the bumper to its original position without damage to either the bumper or hitch and without degradation of the energy absorption characteristics of the combined mechanisms. The hitch is operable with or without other load damping devices, and within both returnable and non-returnable ranges of operation. The hitch is particularly adaptable to use with energy absorption bumpers.

8 Claims, 6 Drawing Figures

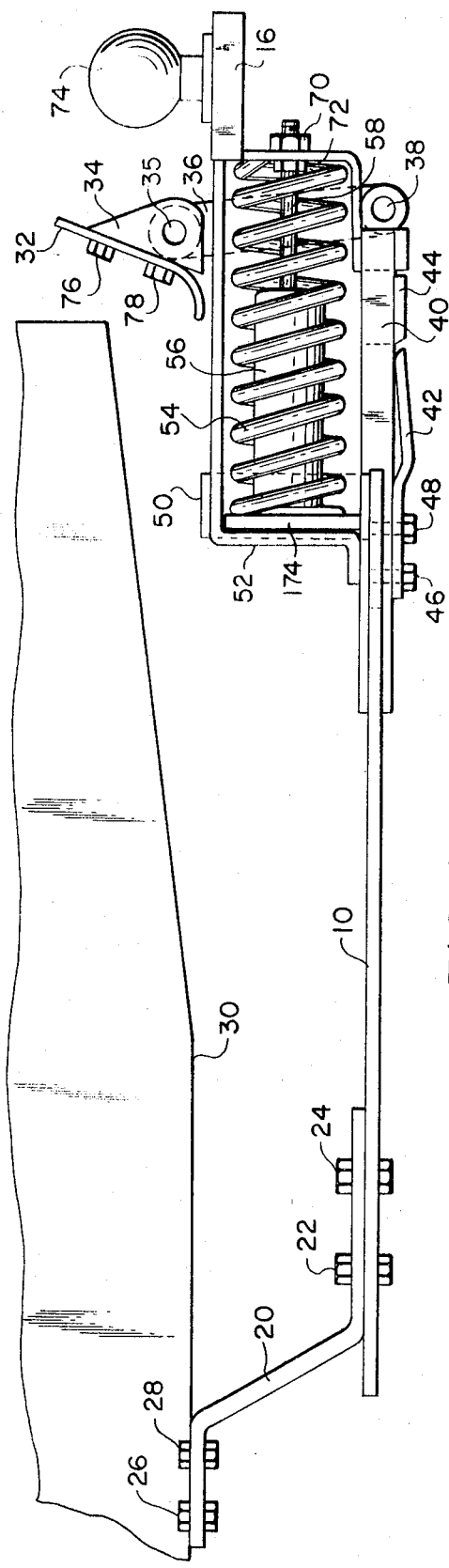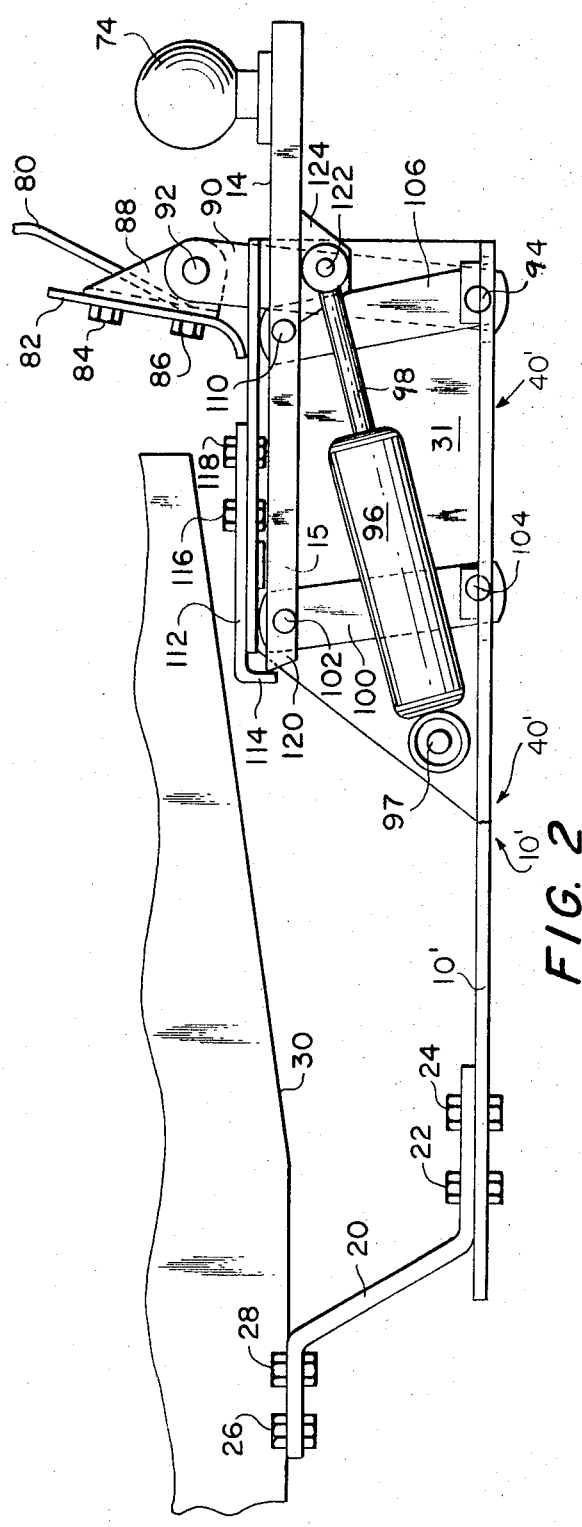

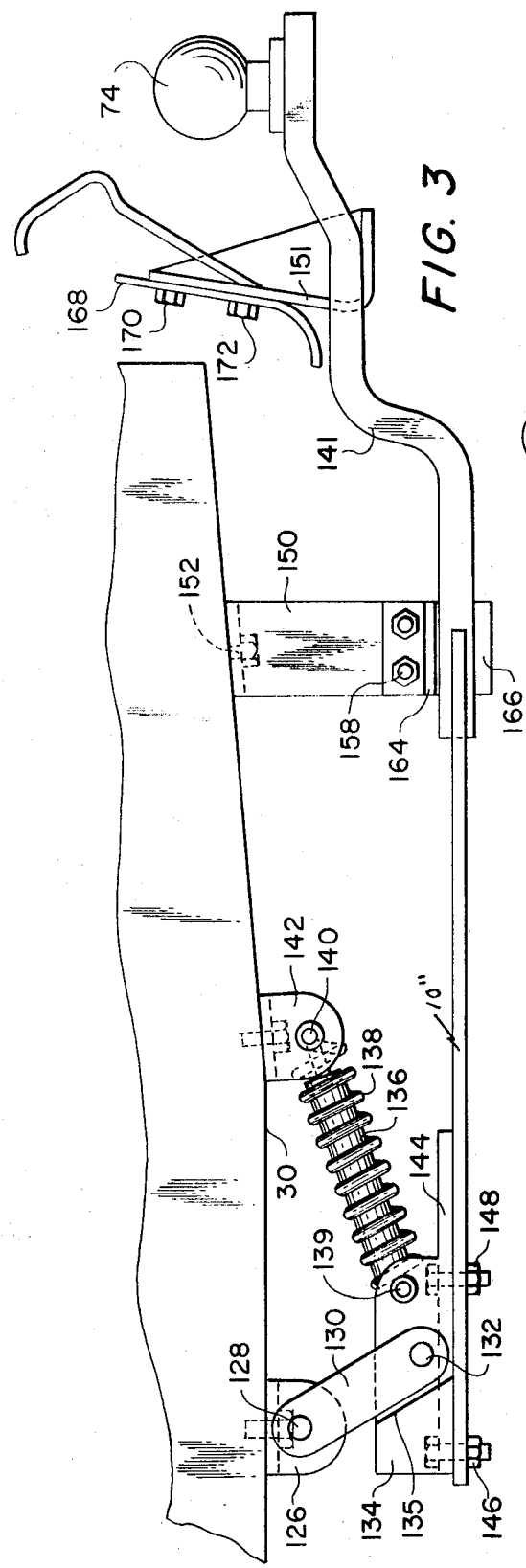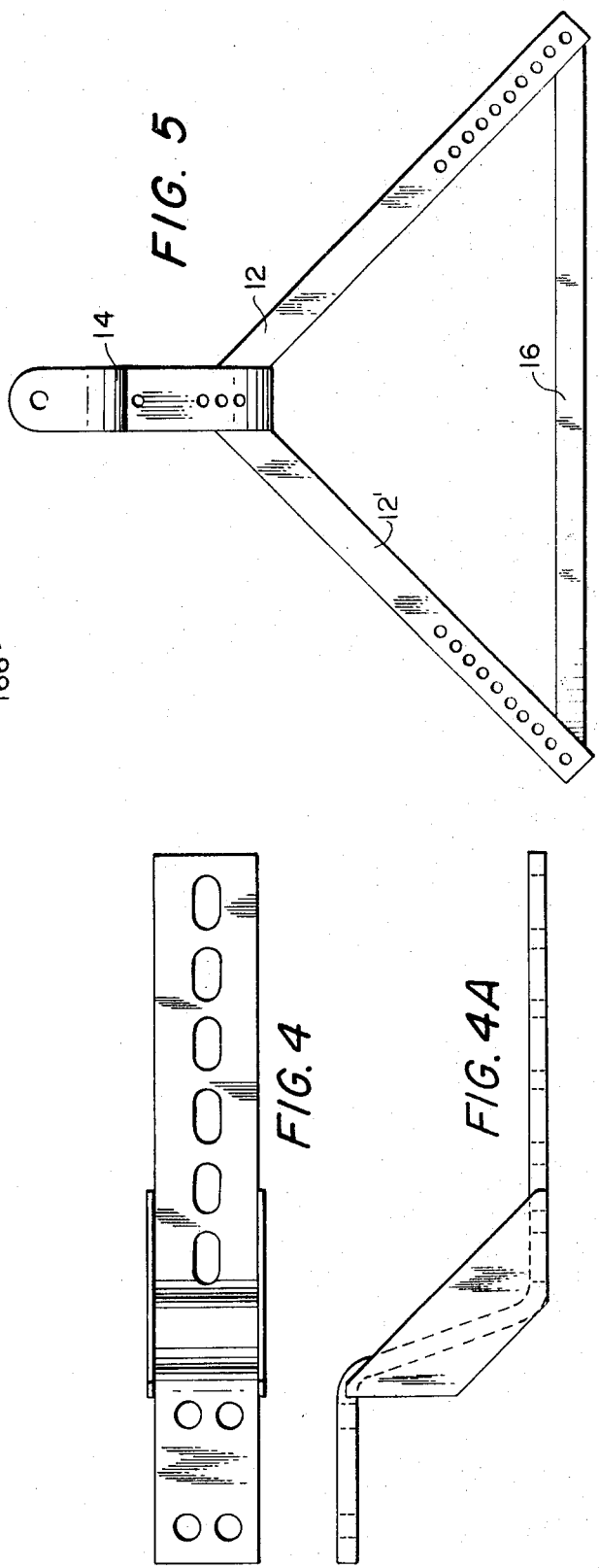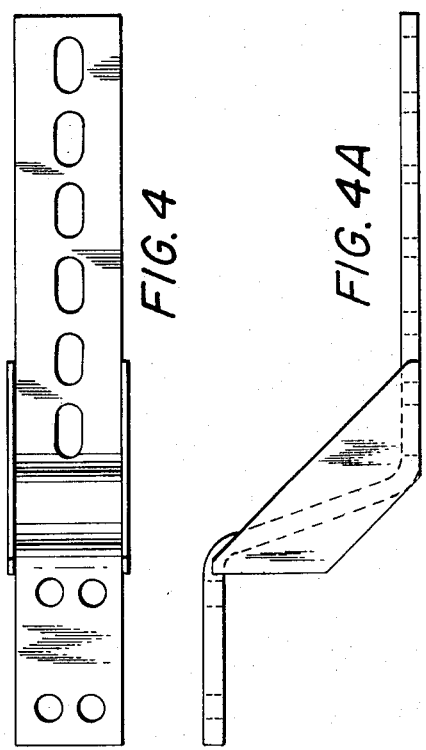

LOAD DAMPING FRAME HITCH FOR VEHICLES TOWING A TRAILER

BACKGROUND OF THE INVENTION

1. Field of the Invention

Motor vehicle hitches for use in pulling trailers. Conventionally, a ball hitch, used in pulling trailers, is mounted either upon the motor vehicle bumper as a temporary attachment or the hitch is secured permanently either to the vehicle frame, or to both the frame and bumper. The hitch is suitable for either permanent or temporary attachment.

2. Description of the Prior Art

Prior art frame and bumper hitches were developed in a period when bumpers were rigidly attached to the frame, and before energy absorbing characteristics became a major factor in the design of the rear ends of motor vehicles. Therefore, prior art makes no provision for relative movement of the bumper in regard to the frame, or to the controlled absorption of loads applied to the hitch. The prior art uses springs to distribute and absorb transient loads, but does not include the concepts of relative motion between attachment points on the tow vehicle or the absorption of energy from sustained loads through a viscous damping device. Prior art frame hitches can only allow relative motion between attachment points by permanent deformation of the structural members.

SUMMARY OF THE INVENTION

According to the present invention, a load damping hitch of the type used for the pulling of a trailer includes a hitch platform secured at its forward end to the vehicle frame and extending rearwardly of the frame. A coupling ball is mounted at the rearward end of the hitch. A bracket is secured at its top to the vehicle bumper and extends downwardly to movably engage the hitch platform. A shock absorbing means is supported upon the hitch platform intermediate the coupling ball and the forward end of the frame. As a result, forward thrust of the ball, imposed by the compressive forces of the trailer as upon braking of the vehicle or rear impact are absorbed by the shock absorbing means.

The coupling ball may be mounted upon a housing which is slidable along the hitch platform and encloses a conventional shock absorber. Also, a combined compression spring and piston element may be used as the shock absorber. In such cases, the rearward end of the hitch platform is suspended from a link attached to the vehicle bumper, the housing sliding or moving independently of the hitch or the bumper. Alternatively, the hitch platform itself may be pivoted at its forward end to the bumper and at its rearward end which supports the coupling ball, the hitch platform may extend through one or more open brackets. The shock means may be interposed between the forward end of the hitch platform and the frame itself. In this later modification the entire hitch platform pivots longitudinally in response to compressive forces of the trailer.

The advantages of the present invention over prior art are:

1. Independent and redundant load paths are provided for the absorption of longitudinaly compression loads.
2. The tow vehicle is given protection from damage resulting from rear impact loads on the trailer.
3. Relative movement between the bumper and frame are permitted.
4. Hitch ball forces are absorbed other than by transmittal to the tow vehicle.
5. Means are provided to establish a threshold of loading prior to actuation of the load damping mechanism.
6. Longitudinal compression loads, up to predetermined limits, can be absorbed without loading the vehicle bumper.
7. Hitch can be used on vehicles equipped with either rigid or energy absorbing rear bumpers.
8. Loads beyond normal towing loads can be absorbed without permanent deformation and the mechanism reset for continued operation by resumption of longitudinal tension loads.

BRIEF DESCRIPTION OF THE DRAWINGS

FIG. 1 is a side elevation, showing the hitch platform mounted at its forward end to the vehicle frame and supporting a coupling ball housing which is slidable upon the hitch platform and independently of the link connection of the hitch platform to the vehicle bumper;

FIG. 2 is a modification, showing a hitch ball being mounted upon a slidable platform which is supported by links at the rearward end of the hitch platform and showing, also, the over-ride link interconnecting the vehicle bumper and rearward end of the hitch platform;

FIG. 3 is a further modification, showing pivotal connection of the forward end of the hitch platform to the vehicle frame;

FIG. 4 is a top plan, showing an adapter bracket used to connect the forward end to the hitch platform to the vehicle frame as in FIGS. 1 and 2.

FIG. 4A is a side elevation of an adapter bracket as in FIG. 4; and

FIG. 5 is a top plan, showing an A frame hitch platform as in FIG. 3.

DESCRIPTION OF THE PREFERRED EMBODIMENTS

In FIG. 1 there is shown an A frame hitch platform 10, secured by means of adapters 20 (refer also to FIGS. 4 and 4A), machine bolts or the like 26, 28, 22 and 24 to the vehicle frame. In FIG. 1, the rearward end of hitch platform 10 converges into the platform 40 which in turn supports platform slide 52, such that the platform slide 52, including coupling ball support 16 and hitch ball 74 may move longitudinally with respect to open bracket 50 which is rigidly attached to platform 40. Spring latch 42 which may be secured by machine bolts 46 and 48 to platform 40 engages ball platform retainer 44. A shock absorbing element 56, including movable rod 58 may be secured in the rear end of the platform slide 52 by means of nut 70 and nut 72. Also, a compression spring 54 may encircle the shock absorbing element 56 so as to abut plate 174 at its forward end and the rear of the housing at its other end. Plate 174 is rigidly attached to platform 40. Bumper support bracket 34 is secured to the vehicle bumper 32 by means of bolts 76, 78 or the like and includes a pivoting link 36 pivoted at its top by means of bolt 35 and its bottom by means of bolt 38 extending through the platform 40.

As will be apparent, coupling ball 74 center of gravity is supported medially on the top and bottom of the vehicle bumper 32 and is held in its rearwardly extended position by the action of compression spring 54.

If the trailer (not illustrated) is backed into a solid object, the spring latch 42 is disengaged, allowing the recoil spring 54 and shock absorber 56 to absorb initial impact. Similarly, if the compressive force exceeds the design load, the hitch ball during towing may force the spring latch open. As a result, the shock absorber absorbs an initial impact, then permits the ball platform 16 to return slowly to the rearwardly extended position illustrated in FIG. 1. This is designed to prevent damage to the trailer, the forward attachment of the tongue or to the bumper itself. However, under normal operating or towing conditions the hitch functions as a frame hitch.

In the modification illustrated in FIG. 2, the forward end of A frame hitch platform 10' is secured by means of adapter bracket 20 having identical bolt or the like connections 22, 24, 26 and 28. A housing 31 is defined at the rearward end of the hitch platform 40', so as to support a pair of swinging links 100 and 106, secured to the hitch platform 40' at the bottom by means of bolts 104 and 94 and secured at their tops by means of bolts 102 and 110, extending through the tongue support platform 14. A platform stop 15 secured to the underside of housing 31 prevents excessive rearward movement of the platform 14. Housing 31 at its top supports a spring latch 112 held by bolts 116 and 118 in the form of downwardly depending shoulder 114 which engages the forward end 120 of platform 14 as a lock. A conventional shock absorbing element 96 including piston 98 may be pivoted in the housing 31 as at 97, extending forwardly via a clevis arrangement to bolt 122 fixed to bracket 124 which is secured to platform 14. Link 90 is pivoted at its upper end as at 92 to bumper bracket 88. Bracket 88 may be secured to the bumper mid-portion — by means of plate 82 and bolts 84 and 86. Link 90 at its bottom end is pivoted in bolt 94 at the rear end of the hitch platform 40'.

When starting to pull a trailer, ball platform 14 moves backwardly into locked position against platform stop 15. If the trailer is backed into a solid object, the spring latch 114–120 disengages and permits the ball platform 14 to pivot forwardly, absorbing the shock. This prevents damage to the trailer or the frame connection or to the bumper itself.

In the FIG. 3 modification, A frame hitch platform 10' (refer also to FIG. 5) includes at its forward end platform 144 supporting stop lock 134 by means of bolts 146 and 148. Forward link 130 interconnects the frame bracket 126 pivoting stud 128 and pivoting stud 132, extending through the stop lock 134. A conventional shock absorber 136 may be pivoted rearwardly in stud 140, extending through shock mounted bracket 142 secured to the frame 30. A frame to hitch platform slide 150 may be secured to the frame by means of bolts 152 or the like and may include lower horizontal portions 164, 166 secured by bolts 158 and slidable engaging the coupling ball support piece 141. A sliding bumper adapter bracket 151 may be secured to plate 168 by means of bolts 170 and 172.

When the car is towing the trailer, pivoting linkage 130 is secured against stop lock shoulder 135 at the forward end of the hitch platform 10' arms. Tension spring 138 and shock absorber 136 are used to maintain the frame hitch in normal pulling position and absorb compressive shock if the trailer is backed into a solid object.

As will be apparent, the hitch and shock absorbing elements can be designed to withstand a predetermined load after which the additional load will be transferred either to the frame or the automobile bumper. For example, a pair of shock absorbing elements in the FIG. 3 configuration may be employed upon individual arms to absorb 800 pounds of compression per arm. Any loads in addition to 1,600 pounds, would be placed directly on the hitch connection itself. Also, in the FIGS. 1 and 2 modification, a load exceeding the compressive elements would be transferred first to the frame without encumbering or loading the automobile bumper.

Manifestly, variations in sliding support of the hitch platform and compressive elements may be employed without departing from the spirit of the invention.

We claim:

1. A vehicle frame hitch of the type used for hitching and pulling trailers comprising:
   A. a hitch platform secured at its forward end to the vehicle frame and extending rearwardly;
   B. a hitch ball secured to a sliding housing at the rear end of said hitch platform;
   C. a bumper adapter bracket secured to the automobile bumper and with linkage extending downwardly to movably support said hitch platform; and
   D. compression means supported upon said hitch platform and interposed between said hitch ball and said hitch platform so as to absorb forward thrust of said hitch ball.

2. A vehicle frame hitch of the type used for hitching and pulling trailers as claimed in claim 1, said hitch platform having a hitch ball housing slidably mounted at the rearward end of said hitch platform and including a compression means mounted within said housing.

3. A vehicle frame hitch of the type used for hitching and pulling trailers as claimed in claim 2, including exterior spring latch means engaging the underside of said housing as a compression over-ride.

4. A vehicle frame hitch of the type used for hitching and pulling trailers as claimed in claim 3, said hitch platform having a bracket slidably encircling said housing and said hitch platform secured to the vehicle bumper by link means pivotably engaging the vehicle bumper at its top end and pivotably engaging said hitch platform at its bottom end.

5. A vehicle frame hitch of the type used for hitching and pulling trailers comprising:
   A. a hitch platform secured at its forward end to the vehicle frame and extending rearwardly;
   B. a hitch ball and support superposed with respect to the rear end of said hitch platform so as to be longitudinally movable;
   C. a link means secured to the vehicle bumper and extending downwardly to movably engage said hitch platform; and
   D. compression means supported upon said hitch platform and interposed between said hitch ball support and said hitch platform so as to absorb forward thrust of said hitch ball.

6. A vehicle frame hitch of the type used for hitching and pulling trailers as in claim 5, including:

E. movable hitch ball platform supported above said compression means, so as to engage said compression means upon forward movement of said hitch ball.

7. The vehicle frame hitch of the type used for hitching and pulling trailers as in claim 6, wherein said compression means includes both a shock absorber and a compression spring.

8. A vehicle frame hitch of the type used for hitching and pulling trailers as claimed in claim 7, including spring latch lock means secured to said hitch platform as engaging said compression means as an over-ride.

* * * * *